PULSE TYPE MODULATOR FOR FACSIMILE SIGNALS

Filed Nov. 29, 1947

INVENTORS
EUGENE R. SHENK
& ANTHONY LIGUORI
BY [signature]
ATTORNEY

Patented Feb. 26, 1952

2,587,541

UNITED STATES PATENT OFFICE 2,587,541

PULSE TYPE MODULATOR FOR FACSIMILE SIGNALS

Eugene R. Shenk, Brooklyn, and Anthony Liguori, New York, N. Y., assignors to Radio Corporation of America, a corporation of Delaware Application November 29, 1947, Serial No. 788,790

2 Claims. (Cl. 178—7.1)

The present invention relates to systems for producing signals representing scanned subject matter such as an object or a representation in the form of a picture, document, printed matter, map, or other form, and, more particularly, but not necessarily exclusively, to a novel apparatus for generating a signal wave, a characteristic of which varies in accordance with signals obtained by scanning subject matter of a proper type for facsimile transmission.

Prior to this invention, a facsimile system generally had a frequency modulator composed of two oscillators in the low radio frequency range beating against each other. Such a system requires two oscillators and a mixer stage. A small frequency drift in either of the oscillators results in a large percentage frequency drift in the beat frequency output. By the present invention a trigger circuit is used as a frequency modulator with the result that numerous advantages flow from this use.

The invention has for its principal aim or object to provide a novel system employing a demodulator and a following modulator for converting amplitude modulated facsimile signals into frequency modulated facsimile signals.

Another aim or object of the invention is to provide an improved method of converting the amplitude modulated facsimile signal to a constant voltage frequency modulated signal.

Another object of the invention is to provide a novel frequency meter especially useful in connection with a facsimile modulator.

A still further object is to provide a novel white control whereby the background or white portion of any piece of subject matter may be set at the established or desired white frequency.

A still further object is to provide an improved demodulating arrangement having means for eliminating the carrier.

A still further object is to provide a frequency modulator that is linear over the wide range of frequencies that is required.

A still further object is to provide an independent black control whereby a desired frequency may be produced which represents the darkest or black portion of a piece of subject matter.

Other objects and advantages of the present invention will become apparent and immediately suggest themselves to those skilled in the art to which the invention is directed from a reading of the following specification in connection with the accompanying drawings in which.

Figures 1, 2:
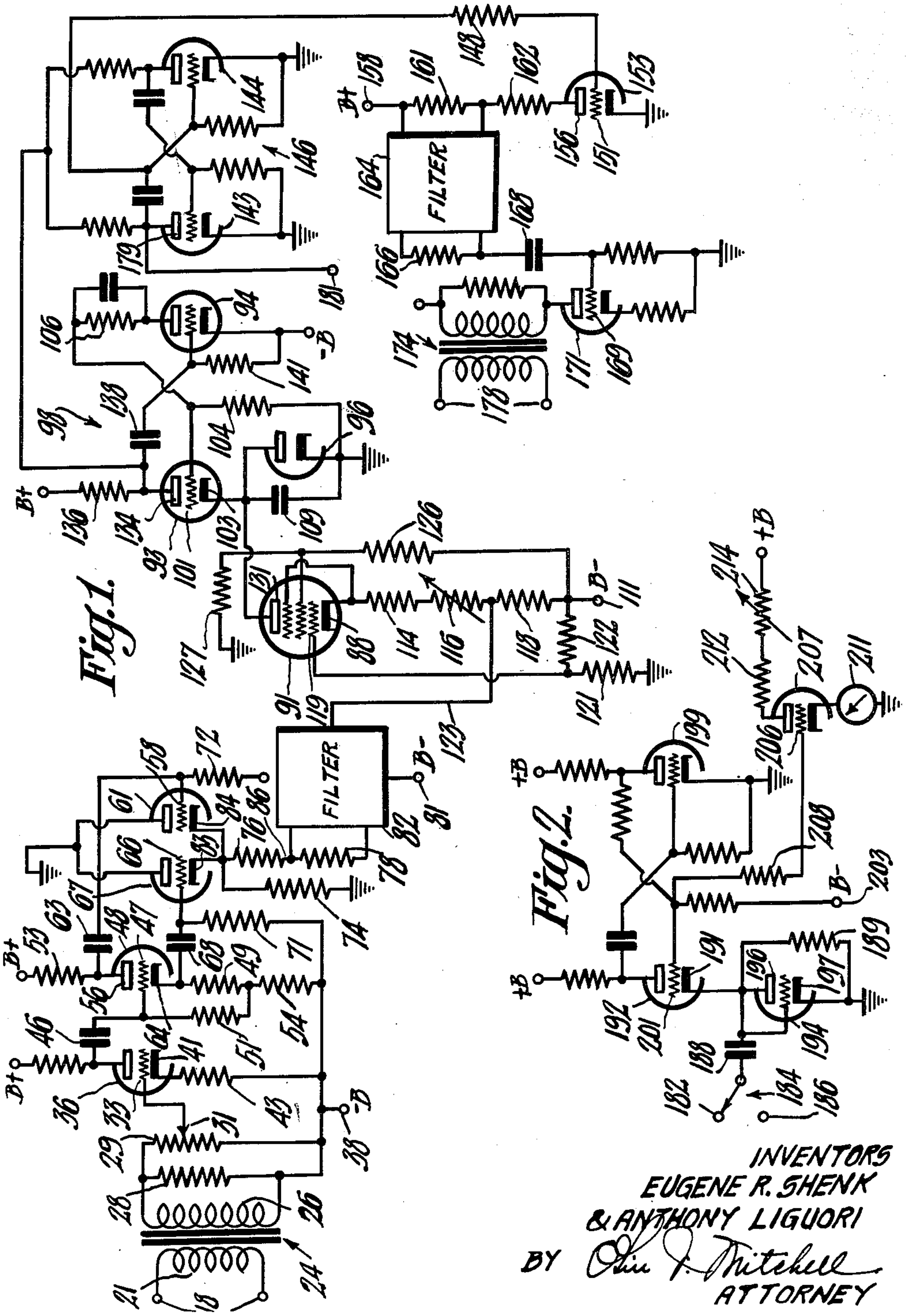
Figure 1 is the schematic diagram of the amplitude modulation to frequency modulation section of a circuit embodying some features of the invention.
Figure 2 is the schematic diagram of a frequency meter circuit embodying some features of the invention.

Referring to Figure 1, an amplitude modulated carrier signal originating in a facsimile scanner (not shown), for example, as explained above is applied to the input terminals 18 of the primary 21 of a transformer 24. The secondary 26 of the transformer is shunted by a resistor 28 and the resistor 29 of a potentiometer 31. Resistors 28 and 29 in parallel supply the proper termination for the transformer 24. The adjustable tap of the potentiometer 31 is connected to the grid 33 of a vacuum tube 36 which serves as an amplifier for the input signal. One leg of the secondary of 26 is connected to the negative terminal 38 of a suitable source of plate or "B" voltage (not shown). The grid 33 of the tube is negatively biased with respect to the cathode 41 by the voltage drop across a cathode resistor 43. Resistor 43 is connected between cathode 41 and the B— terminal 38. In accordance with the invention a white control is provided which provides a signal of such value that the portions of the subject matter being scanned for transmission, which have the greatest reflectivity, for example, will be rendered as "white" for instance by the recorder at a receiving station. That is, the gain value necessary for any piece of copy is set by its whitest part in the illustrative example of Figure 1. The potentiometer 31 serves as the white control. By varying the amount of voltage applied to the grid of the tube 36, the background signal level can be adjusted to give the proper frequency output from the system to correspond to this level. The amplified signal voltage is coupled through a condenser 46 to the grid 47 of a vacuum tube 48. The grid 47 is negatively biased by the voltage drop across a resistor 49. A resistor 51 serves as the grid return for the tube 48. A plate load resistor 53 together with a resistor 54 and the resistor 49 and the connections thereto cause the tube 48 to serve as a phase inverter. The signal from the plate 56 of the tube 48 is coupled to the grid 58 of a tube 61 through a condenser 63. The signal from the cathode 64 of the tube 48 is coupled to the grid 66 of a tube 67 through a condenser 68. The resistors 49 and 54 together have substantially the same total value as the resistor 53. Resistors 71 and 72 are grid returns for the grids 66 and 58. The tubes 67 and 61 constitute a demodulator for amplitude modulated signals. These tubes act together as a full wave rectifier and are biased to cut-off due to current flow through resistors 74, 76 and 78 from the terminal 81 which is or may be connected to the same point as the terminal 38 mentioned above. The terminal 81 is connected or coupled to the associated circuits (not shown) of a filter 82. This filter is of the low pass type having a resistive input. The input resistor, which in the illustrative example is the resistor 78, serves to connect the terminal 81 to the cathode 83.

The demodulation process as carried out by the tubes 67 and 61 will now be described. The signal on the grid 47 of 48 is sinusoidal, usually of the order of 2000 cycles per second, for example, depending on the system served by the invention and the scanner coupled to the terminals 18. When the signal on the grid 47 of the tube 48 is on the positive half cycle, the resulting signal on the plate 56 of this tube is on the negative half cycle and the resulting signal on the cathode 64 of this tube across the resistors 49 and 54 is on the positive half cycle. The plate signal coupled through the condenser 63 to the grid 58 of the tube 61 causes it to go more negative. As the grid 58 of this tube 61 was at cut-off with respect to its cathode 84, there is no change. The positive signal from the cathode 64 of the tube 48 is applied at the same time to the grid 66 of the tube 67, causing the grid to go more positive than cut-off. This causes the tube 67 to conduct and the tube current varies the current through the circuit that includes the resistors 74, 76 and 78.

When the signal on the grid 47 of the tube 48 is on the negative half cycle, the resulting signal on its plate 56 is in its positive half cycle. The resulting signal on the cathode 64 of the tube 48 is on its negative half cycle. The plate signal from the tube 48 is coupled to the grid 58 of the tube 61 causing this grid to go more positive with respect to its cathode. This causes the tube 61 to conduct and the resulting tube current varies the current through the resistors 74, 76 and 78. The negative signal from the cathode 64 of the tube 48 is applied simultaneously to the grid 66 of the tube 67 causing this grid to go more negative with respect to the cathode 83 of the tube 67. As the grid was already at cut-off there is no change.

It can thus be seen that for every cycle at the grid 47 of the tube 48 there are two cycles at the junction point 86 of the resistors 76 and 78. The input to the filter 82 is taken from this junction point. The low pass filter 82 attenuates the carrier applied to the terminals 18 which appears at the input of the filter 82 at double frequency. The signal frequencies, facsimile signals in the illustrative example, which are modulated on the carrier are passed through without attenuation.

At the output of filter 82 there are only varying amplitude D.-C. signals which are fed into the cathode 88 of a tube 91. Tubes 91, 93, 94 and 96 together with their associated components constitute a wide band frequency modulator designated generally by the reference character 98. The basic features of this modulator are disclosed and claimed in the copending application of Shenk and Liguori for "Wide Band Frequency Modulator" S. N. 789,788 filed December 5, 1947, now Patent No. 2,505,368, granted April 25, 1950. Under steady state conditions the tube 94 is conducting and the tube 93 is non-conducting. The grid 101 of the tube 93 is held very negative, with respect to its cathode 103, by the voltage drop across a resistor 104 due to current flow through the tube 94, a resistor 106 and the resistor 104. A condenser 109 connects the cathode 103 of the tube 93 to ground. This condenser is charged negative by the electron flow from the tube 91.

It will be noted in this connection that the cathode 88 of the tube 91 is connected to a terminal 111 which is or may be connected to the same point as the terminals 38 and 81 previously mentioned through a series of resistors 114, 116 and 118. The resistor 116 is preferably adjustable and functions as a "black control" in a manner to be described. The terminal 111 is connected to a point on the B voltage supply which is more negative than ground. The signal grid 119 of the tube 91 is connected to the junction point of resistors 121 and 122. The input connection to the filter 82 is shown in the illustrative example as a conductor 123. Screen grid voltage for the screen grid 126 is supplied from the junction point of a pair of resistors 126 and 127.

The plate 131 of the tube 91 is connected to the cathode 103 of the tube 93. The plate 134 of this latter tube is connected to the positive terminal of the B supply through a resistor 136. This terminal of the supply source (not shown) may be the same as that to which the resistor 53 is connected. The plate 131 of the tube is negative with respect to ground with the tube 93 cut off and, therefore, the condenser 109 is negatively charged.

When the voltage across the condenser 109 reaches a critical magnitude, the tube 93 conducts and discharges it. The diode 96 supplies current to keep the tube 93 conducting if desired, even after the condenser 109 is entirely discharged. The conducting time of the tube 93 depends primarily on the time constant of the R-C circuit including a condenser 138 and a resistor 141.

In the modulator 98, constructed in accordance with the present invention, the signal is furnished to the cathode 88 of the tube 91 instead of the signal grid as shown in the copending application referred to above. The signal grid 119 of the tube 91 is negative with respect to the cathode but it is not at cut-off. At no signal in, there is current flowing through the tube 91 and firing tube 93 at a certain frequency. The variable resistor 116 in the cathode circuit of the tube 91 varies the current flow through this tube by adding or subtracting resistance from the cathode circuit. By varying the current flow, the no signal frequency out of the modulator can be set as desired. It is the black control, so that when the signal corresponding to the darkest portion or "black" of the scanned subject matter is furnished to the cathode 88 of the tube 91, the resistor 116 can be adjusted to give the proper frequency for black. The signal representing the white portion of the scanned subject matter is a signal of larger amplitude and after demodulation results in a more positive signal than when black is scanned. When a positive signal is furnished to the cathode 88, it is the same as making the grid more negative with respect to the cathode. The current through the tube 91 is decreased and the tube 93 is fired less often causing the output frequency to be lower for a white signal than for a black signal. The resistor 114 is a suitable resistor for biasing purposes. The resistor R118 serves as a termination for the filter 82 and also for biasing purposes.

A pair of tubes 143 and 144 and their associated components constitute a multivibrator 146 which divides the output frequency of the wide band frequency modulator 98 by two. Inasmuch as multivibrators are by now well known devices in the electronic art, a detailed description is believed to be unnecessary. The output of the frequency modulator 98 consists of negative pulses at twice the desired frequency. The negative pulses synchronize the multivibrator. The output of the multivibrator consists of 50/50 square waves at the desired frequency. Before filtering, this square wave signal is connected through a large resistor 148 to the grid 151 of an isolation tube 153.

The plate 156 of the tube 153 is connected to the positive terminal of a suitable plate voltage supply source by way of a terminal 158. This supply source may be the same as that to which the resistor 53 of the tube 48 is connected. The resistors 161 and 162 are included in the plate circuit of the tube 153.

A low-pass filter 164 is coupled to the resistor 161. Since the input to the filter is in the form of 50/50 square waves, the third harmonic of the lowest deviation frequency is the lowest frequency to be attenuated. The main function of the filter 164 is to keep the frequency modulated signals within the frequency band allocated to them.

The output of the filter 164 appears across a terminating resistor 166 and consists of sine waves inasmuch as a large portion of the harmonic content of the square wave is removed by the filter. The output of the filter 164 is coupled through a condenser 168 to the grid 169 of the tube 171. The tube 171 with its associated circuits together with a transformer 174 constitute an output stage and an impedance matching device.

The output appearing at the terminals 178 consists of sine waves of varying frequency corresponding to all of the shades from black to white of the scanned image. The signal amplitude at these terminals is constant. The signal obtained from the terminals 178 may, for example, be fed to a radio transmitter for radio transmission.

Figure 2 of the drawings discloses a frequency meter circuit which may be employd to measure the frequency of the transmitting signal, which in the illustrative embodiment is obtained from the plate 179 of the tube 143. A terminal 181 is or may be provided for readily obtaining access to the plate connection of the multivibrator tube. When the apparatus of Figure 1 is to be used with the apparatus of Figure 2, the terminal 181 may be connected to one contact 182 of a switch 184. The remaining contact 186 of the switch is available for other purposes such as the application of a calibration frequency to the frequency meter circuit of Figure 2.

A coupling condenser 188 and a resistor 189 differentiate the square wave input. A differentiated output of this R-C circuit is fed as pulses to the cathode 191 of the tube 192. A tube 194 has its plate 196 and cathode 197 connected in series with elements of the tube 192 to ground.

The tube 192 together with the tube 199 and their associated components constitute a trigger circuit with the tube 199 normally conducting and the tube 192 normally non-conducting. The grid 201 of the tube 192 is normally held very negative with respect to its cathode. Bias for this purpose is supplied from a terminal 203, which is or may be connected to the same point of a suitable voltage supply as the terminal 38 of Figure 1. When a negative pulse is applied to the cathode 191 of the tube 192 it causes this tube to conduct. The tube 194 supplies the electrons through a low impedance path to keep the tube 192 conducting as long as desired.

The grid 206 of a tube 207 is connected through a resistor 208 to the grid 201 of the tube 192. The tube 207 conducts and is non-conducting at the same time as the tube 192. Every time the tube 207 conducts, a fixed amount of current is passed through this tube and through a milliammeter 211. As the frequency of the measured signal increases, the number of times current is passed through the milliammeter is increased. The current through the milliammeter thus increases linearly with frequency.

The plate of the tube 207 is connected to a suitable source of plate voltage (not shown) through a resistor 212 and an adjustable resistor 214. Assuming that a milliammeter 211 is used in the cathode circuit of the tube 207, then with a proper value of resistance in the plate circuit of the tube 207, the circuit can be adjusted so that at 2 kilocycles, 2 milliamperes will flow through the meter 211. The meter will then read kilocycles directly as well as milliamperes.

The operation of the apparatus of Figure 1 will, it is believed, be understood from the detailed description of the foregoing. However, the operation will be reviewed briefly at this point. Amplitude modulated signals from any type of facsimile scanner or the like are applied to the terminals 18. This input signal is amplified by the tube 36. The tube 48 serves as a phase inverter to apply the amplified signals to a demodulator comprising the tubes 61 and 67. This demodulated signal is filtered and applied to an FM modulator indicated generally by the reference character 98. The output from the modulator is filtered and converted to sine wave form and appears at the resistor 166 which forms a terminating impedance for the filter 164. A tube 171 and its associated circuits constitute an impedance matching device and the frequency modulated output signal appears at the terminal 178 and is available for transmission, for example, by radio transmitter.

Having now described the invention, what is claimed and desired to be secured by Letters Patent is the following:

1. A facsimile transmission system comprising means to amplify a facsimile signal in the form of a carrier wave amplitude modulated by image signals representing the scanning of a subject copy, means to demodulate the signal to recover the image signal, a filter for said demodulated image signal, said demodulated signal having a less positive value representing black of the copy and a more positive value representing white of the copy, a wide band frequency modulator, input means for said frequency modulator from said filter comprising an amplifier tube, and a black control for said system comprising a variable resistor in the cathode circuit of said amplifier tube whereby to provide maximum modulation frequency for black.

2. A facsimile transmission system comprising means to amplify a facsimile signal in the form of a carrier wave amplitude modulated by image signals representing the scanning of a subject copy, the input means for said amplifying means comprising a white control for the system to provide maximum signal for white of the copy, means to demodulate the signal to recover the image signal, a filter for said demodulated image signal, said demodulated signal having a less positive value representing black of the copy and a more positive value representing white of the copy, a wide band frequency modulator, means to furnish said image signal to said modulator, said last named means including a black control for the system, means to divide said wide band frequency modulated signal by two, a low-pass filter for filtering the square wave output of said multivibrator, said filter being designed to attenuate the third harmonic of the lowest deviation frequency, and means to couple the sinusoidal output of said filter to an impedance matching device.

EUGENE R. SHENK.
ANTHONY LIGUORI.

REFERENCES CITED

The following references are of record in the file of this patent:

UNITED STATES PATENTS

| Number | Name | Date |
|---|---|---|
| 2,060,778 | Finch | Nov. 10, 1936 |
| 2,204,061 | Andrieu | June 11, 1940 |
| 2,298,409 | Peterson | Oct. 13, 1942 |
| 2,338,395 | Bartelink | Jan. 4, 1944 |
| 2,378,581 | Roberts | June 19, 1945 |
| 2,403,557 | Sanders | July 9, 1946 |
| 2,405,597 | Miller | Aug. 13, 1946 |
| 2,456,026 | Shenk et al. | Dec. 14, 1948 |